July 30, 1957    W. B. HEBENSTREIT ET AL    2,801,362
AMPLIFICATION OF MICROWAVES

Filed July 15, 1948      5 Sheets-Sheet 1

INVENTORS
W. B. HEBENSTREIT
J. R. PIERCE
BY
*N. S. Ewing*
ATTORNEY

INVENTORS: W. B. HEBENSTREIT
J. R. PIERCE
BY
ATTORNEY

July 30, 1957 W. B. HEBENSTREIT ET AL 2,801,362
AMPLIFICATION OF MICROWAVES
Filed July 15, 1948 5 Sheets-Sheet 4

INVENTORS: W. B. HEBENSTREIT
J. R. PIERCE
BY
N. A. Ewing
ATTORNEY

July 30, 1957   W. B. HEBENSTREIT ET AL   2,801,362
AMPLIFICATION OF MICROWAVES
Filed July 15, 1948                          5 Sheets-Sheet 5

INVENTORS: W. B. HEBENSTREIT
J. R. PIERCE
BY
N. A. Ewing
ATTORNEY

United States Patent Office 2,801,362
Patented July 30, 1957

2,801,362

AMPLIFICATION OF MICROWAVES

William B. Hebenstreit, Palos Verdes Estates, Calif., and John R. Pierce, Millburn, N. J., assignors to Bell Telephone Laboratories, Incorporated, New York, N. Y., a corporation of New York Application July 15, 1948, Serial No. 38,928

29 Claims. (Cl. 315—5.14)

The present invention relates to the amplification of electrical waves by electronic means for such purposes as generating waves or amplifying applied input waves. The invention is of particular application to the field of microwaves but is not limited to such field since it can be used also for longer waves.

One of the main objects of the invention is to achieve gain or amplification within an electron discharge space by interaction between electrons traveling through such space with different velocities.

A related object of the invention is to produce a space-charge wave having negative attenuation. Stated otherwise, this object of the invention is to produce space-charge waves which increase in amplitude with distance of travel in a discharge space.

A further object is to achieve gain in an electron convection path and without the necessity of interaction between an electron stream and a conductor, guide or other current carrying element.

A further object is to secure gain by interactions between adjacent electron streams of different velocity or between component parts of an electron stream of different velocity.

Objects of the invention include both the novel method and novel means of amplification by the use of a plurality of, such as two, electron streams or electron stream components differing in velocity, as a result of interactions which take place between the streams or stream components during their travel through an evacuated space.

Objects of the invention include: increased gain over wide bands, improved operation of short wave amplifiers and oscillators, simplification of apparatus and effective amplification of waves in the centimeter and millimeter ranges.

The invention, while making use of some of the features and components of velocity-modulated devices and traveling wave tubes, is believed to involve a fundamentally new principle of operation, based upon the discovery by applicants of a space-charge wave of negative attenuation, which is found to exist when two electron streams of sufficient current density and somewhat different velocities flow adjacent each other in an evacuated discharge space. By a space-charge wave having negative attenuation, is meant one which increases in amplitude with the distance through which it travels.

In amplifiers using velocity-modulation to change the positional relations of electrons in the longitudinal direction of the stream and having a drift space in which so-called bunching can take place, the amplification is obtained by placing a tuned circuit (e. g., resonant cavity) at such point along the stream that the bunched electrons move through the field of the circuit in phase opposition to the electromagnetic wave in the circuit. The interaction between the wave flowing in the circuit and the bunched electrons slows the forward motion of the latter and thus absorbs some of their energy. The amplitude of the wave in the circuit is thereby increased.

In ordinary traveling wave tubes, a continuous interaction takes place between an electron stream and the field of a current flowing in a transmission path paralleling the stream, the phase relations between the convection current in the stream and the current flowing in the adjacent current path being such as to cause transfer of energy from the stream to the current in the transmission path in continuous manner with distance along the path. In this process also, the forward motion of the electrons is slowed.

In both of these types of amplifier devices, there is a conversion from the motional energy of the electrons in the stream to the electromagnetic energy of a current flowing in a resonator, conductor, guide or the like. This action partakes of the nature of both a mechanical and an electromagnetic process. Whether an electron in the stream raises the voltage across a gap in the circuit or increases the rate of movement of charges along a conductor (i. e., increases the current) the reaction is upon the stored electric energy (capacity) and the stored magnetic energy (inductance) of the circuit. In such systems the stored electric energy and the stored magnetic energy are equal.

In contrast to all such types of amplification involving a combination of mechanical and electromagnetic action, the present invention achieves amplification by an action that may be termed electromechanical in nature. It is believed that for the first time there has been produced by this invention an electromechanical or space-charge wave which is propagated along through an evacuated space with an amplitude that increases with distance of travel. Two electron stream or stream components of different velocity are used. Amplification occurs in the wave in the electron streams themselves by interactions taking place between electrons in the streams whereas, so far as applicants are aware, amplification has not been obtained heretofore except by interaction with a conductor, guide or the like. In amplification involving only electromechanical action the place of the inductance, or, of magnetic stored energy, so essential in the velocity-modulation and traveling wave types of amplifiers discussed above, is filled by the mass of the electrons. There are magnetic fields but the magnetic stored energy is much less than the electric stored energy and does not play an important role.

From the point of view last considered the present invention may be said to contemplate a pair of electron stream (whether of the same or different velocities) that are both modulated by the same signal (whether the electron velocity is modulated or the convection current, or both; and whether both streams are modulated separately or one by the influence of the other), and that are electrically coupled to each other (whether by virtue of their proximity to each other, or otherwise) at numerous points such that the transit time of electrons of one stream between two points of coupling is different from the transit time of the electrons of the other stream beween corresponding points of coupling. Under these circumstances, when a signal is impressed on one or both streams the electron convection currents of the two streams will not be in phase but will have some phase angle with respect to one another, and this phase angle will result in a transfer of kinetic energy from one electron stream to the other and an increase in the amplitude of the alternating component of the convection current of both streams.

After amplification has taken place in the streams themselves, some circuit element is necessary for taking off the energy into a circuit or system where it is to be used. For example, a resonator may be used for this purpose. Such a circuit element (resonator) is, however, merely a transducer from one kind of wave (electromechanical) in the electron stream to another (electromechanical) in the output circuit, and is not an essential component in producing amplification. This can be seen from the fact that when the type of amplification of the invention is used to produce self-sustained oscillations, the device will oscillate regardless of how low may be the impedance of the resonator or resonataors used for taking off the oscillations or remodulating the streams.

The amplification achieved by the invention may, therefore, be termed essentially circuitless since the amplification itself occurs in the waves in the streams and without interaction of an electron stream with resonators, transmission lines or the like.

In devices using a single electron stream, as in the velocity-modulated amplifier device, there is a space-charge wave (electromechanical) which travels along the stream but it exhibits no gain. Analytically considered, there are two waves which are initially out-of-phase for convection current and in-phase for velocity-modulation. As they travel along the electron stream, one overtakes the other and they become in-phase for convection current and out-of-phase for velocity modulation. Neither wave increases with distance. High impedance resonators acting in conjunction with the electron stream are essential in obtaining gain.

In the double-stream amplifier tube of the invention, which in one form may use a resonator or short helix near the cathode for velocity-modulating the stream and another resonator or short helix near the other end of the tube for taking off the power, gain can be obtained no matter how low the impedance of these resonators (or helices) may be, as was said in the oscillator case also. It is only necessary to make the space between the input and output resonators, or other coupling devices, long enough, since the gain takes place in the waves in the electron stream. It is true that higher impedance resonators or other coupling devices may result in better efficiency and so may be used in practice, but gain can be obtained regardless of their impedance. Each electron stream interacts with the other stream and not with the electromagnetic wave in a circuit in producing gain.

One peculiarity about the use of two streams to obtain gain is that no gain is obtained unless the current density in the streams exceeds a definite minimum. The reason for this is not clearly understood at this time but it is a manifestation of a fundamental difference between the kind of electromechanical interaction made use of by the invention and the interaction between an electron stream and an electric current used for gain production in known devices such as traveling wave tubes and the like. The space-charge wave in the double-stream amplifier of the invention, at low levels, increases exponentially with distance along the streams.

Difficulty has heretofore been encountered when endeavoring to amplify at very short wavelengths in getting a good low-loss circuit and in getting the electron stream close enough to the circuit to obtain adequate coupling without losing electrons through their striking the circuit. These difficulties are overcome in the device of the invention since, in effect, one beam acts as a "circuit" for the other, resistive losses are avoided and a close coupling without collision can be assured by intermingling the streams of different velocities.

In the detailed description to follow, it will be shown how to go about calculating the dimensions of amplifiers in accordance with this invention making use of the basic principles discussed in general terms above, and illustrative tube designs and structures for practicing the invention will be given. Since it is to be expected that the basic concept of the invention will be found adapted for embodiment and use in a wide variety of structural forms, the particular structures disclosed herein are not to be regarded as in any sense limiting but are to be considered as given by way of example.

In the accompanying drawings:

Figs. 8 to 12 show different devices that may be used for separating the faster from the slower stream before taking off the output waves;

Figure 1:
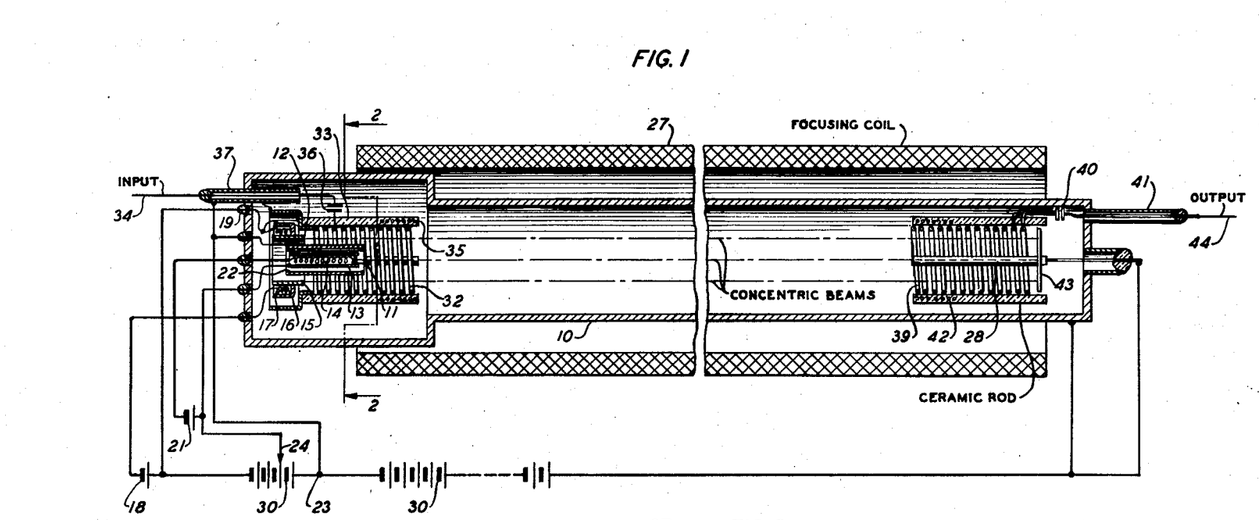
Fig. 1 is a longitudinal sectional view of an amplifier device according to the invention in one form.
Figure 2:
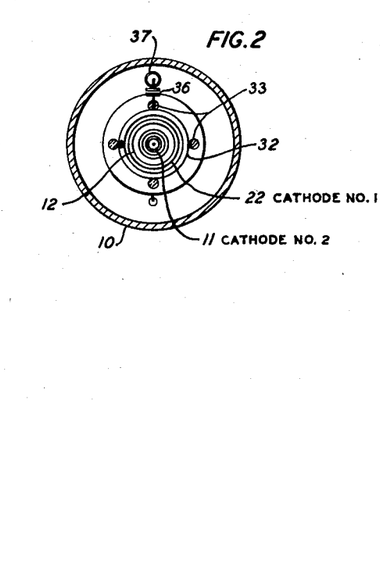
Fig. 2 is a cross-sectional view of the device of Fig. 1 taken on the line 2—2.

Referring to Figs. 1 and 2 the elongated cylindrical enclosure 10 is evacuated and is provided at its left-hand end with a central cathode 11 and an annular shaped cathode 12 surrounding cathode 11. Cathode 11 is formed on the end face of a metal tube 13 inside which is a heater coil 14. Cathode 12 is formed on the edge face of a ring 15 which has a rearward flange 16 formed on its exterior to provide a space for heater coil 17. The emitting surfaces may be formed by suitably coating the areas used. A common lead for cathode 12 and one terminal of heater coil 17 is brought out through a glass bead 19 to the positive pole of a battery 18. A vacuum-tight seal is made between the bead 19, the tube 10 and the lead wire. The other leads brought out through the base are, similarly, carried through glass bead seals. The opposite terminal of heater coil 17 is connected to the other side of battery 18. One terminal of heater coil 14 is connected to one side of battery 21 while the common lead for the other terminal of coil 14 and cathode 11 is connected to the opposite side of battery 21. A positively biased cylindrical electrode 22 concentric with cathodes 11 and 12 and located between them is for accelerating electrons from both cathodes, this electrode being connected to a point 23 in the divided battery, more positive than either cathode. Cathode 11 is made more positive than cathode 12 by the portion of the battery 30 included between tap 24 and 18.

The metallic envelope 10 (e. g. of copper) is connected to a point of still higher positive potential in battery 30 than the cathodes, and a coil 27 supplied with direct current from a battery or other suitable source, not shown, provides magnetic focusing of the two beams from the two cathodes. An anode 28 at the right-hand end is connected to the most positive point of battery 30, as is also the metallic envelope 10.

The parts so far enumerated constitute means for projecting lengthwise of tube 10 two concentric electron beams which have different velocities, the central beam having the lesser velocity since its cathode 11 is at a more positive potential than is cathode 12 for the outer beam. The direct current driving voltage is, therefore, greater for the outer beam than for the inner beam. This provides the setting for bringing into existence a space-charge wave traveling in the direction from left to right and growing in amplitude, provided certain quantities have the proper magnitudes, these quantities being being principally (1) velocity difference between the two streams, and (2) current density in the streams. Also the distance allowed for the travel of the streams must be several wavelengths at the frequency of the space-charge wave, the greater the distance the greater the amplitude finally reached by this wave, up to an asymptotic limit.

In order to utilize the space-charge wave for amplification of applied waves, suitable means must be provided for modulating one or both streams near their source by the wave to be amplified, and for abstracting the amplified wave energy from one or both streams near the end of their travel. These means may be of several different types, some of which are illustrated in the different figures to be described.

The modulating means illustrated in Fig. 1 comprises a helix of wire 32 supported on ceramic rods 33 or on the inside surface of a ceramic cylinder, this coil embracing both streams for a distance near the beginning of their travel path. The input lead 34 is brought out from a suitable point in the helix through a coupling condenser 36 and coaxial line 37, the tapping point on the helix and size of condenser 36 being chosen to give an impedance match between the external input circuit and the helix. Suitable matching termination is provided at the opposite end of the helix by including loss material 35, which may be finely divided metal or carbon, in the ceramic rods 33 or on their surface, near one end.

If the helix is short and the velocity of propagation along it in the direction of the streams is near to the stream velocities, for example, the mean between them, both streams will be velocity modulated by the input waves. If the helix is longer and if the velocity of propagation along it is the same as the velocity of one of the streams, that stream will be velocity-modulated and the other stream will not.

The means disclosed in Fig. 1 for taking out the amplified wave is, likewise, a helix 39 surrounding the electron streams near the end of their travel. It is similarly connected to the external, in this case the output, circuit 44 by a tap connection on the helix, a coupling condenser 40 and coaxial line 41. Loss material 42 provides proper resistive termination at the opposite end of the helix.

It may be desirable to couple the output helix 39 to only the outer stream. This can be done by making the anode 28 in the form of an axial rod extending through the helix so as to intercept the center beam before it enters the helix. A shoulder 43 is provided on the electrode 28 for intercepting the outer beam after it has traversed the helix.

In Fig. 1, as in the other figures to follow, the electrical rather than the mechanical aspects of the device have been stressed, and no attempt has been made to show how the various elements would be supported in relation to each other or how their assembly would be provided for, since it is thought that all such features can be supplied in obvious manner from the mechanical side of the vacuum tube art. It is only pointed out here that suitable supports will be necessary in a practical embodiment for holding the parts in proper spaced relation to one another and for allowing for application to them of the necessary voltages. The metal envelope 10 can be pumped in usual manner, de-gassed and sealed off by means of a glass tube (not shown) welded to the envelope, or in a manner used in making vacuum tubes with metal envelopes.

In the operation of the device disclosed in Fig. 1, the total beam made up of two streams of different velocities from cathodes 11 and 12 can be made to support a space-charge wave which travels in the direction in which the electrons are projected, with a large negative attenuation amounting to several decibels per wavelength of travel, when certain conditions as to current density and velocity separation are fulfilled, the directions for which will be given in the disclosure of design procedure to be outlined later on. If, under such conditions, a velocity modulation is produced near the cathode end of the tube, an increasing wave of current, field and velocity will travel down the tube. This modulation is produced in Fig. 1 by impressing the signal or other input waves on helix 32 via lead 34, the effect being to cause velocity-modulation of the outer stream, from cathode 12. The signal modulation increases in amplitude over the several wavelengths distance of travel down the tube 10, and sets up in the pick-up helix 39 an amplified signal which is taken off by output connection 44.

Figure 3:
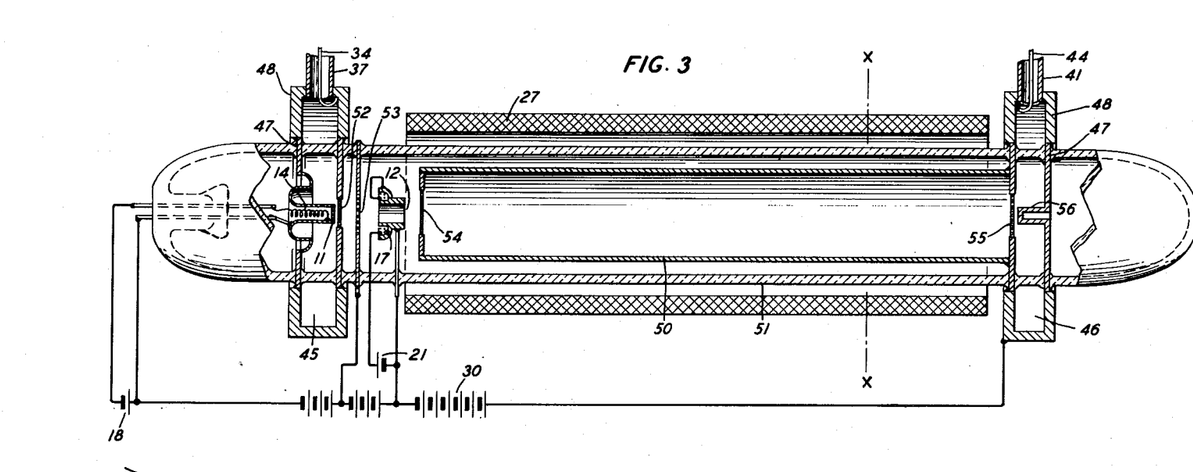
Fig. 3 is a longitudinal sectional view of another form of embodiment of the invention in an amplifier.

Fig. 3 discloses another form of amplifier according to the invention in which in this case the signal or other modulations are impressed on the central of two concentric streams. The cathode for the central stream is shown at 11 and the annular-shaped cathode for the outer stream is shown at 12. A heating coil 14 serves for cathode 11 and is supplied with current from battery 18 while a heating coil 17 heats the second cathode and is supplied with heating current from battery 21. A portion of the divided battery 30 is included between the connections to the two cathodes which connections are made at one terminal of the respective heating circuit and this portion of the battery makes the cathode 12 positive with respect to the cathode 11. The inner of the two streams, therefore, has the higher velocity. A focussing winding 27 is provided as in the case of Fig. 1.

Accelerating grid 53, which is biased positively with respect to cathode 11, serves to accelerate the inner stream. A second accelerating grid 54, formed in the end of the elongated cylindrical metal tube 50 serves to accelerate both streams, the tube 50 being at a high positive potential because of the connection to the positive end of the battery 30. The two concentric streams are thus projected lengthwise of the tube through the interior of the cylinder 50 with two different velocities.

In this embodiment, the signal or other input variations are impressed on the inner stream by means of the control grid 52 which is formed in one of the walls of the resonant cavity 45. The input modulating signal is applied to the resonant cavity through the coaxial conductor 34, 37. Cavity 45 is tuned to the frequency of the input waves.

At the opposite end of the tube the energy is abstracted by a second resonant cavity 46 which is provided with a narrow gap 55, 56 by the grid 55 which is built into one wall of the cavity and by the face of the reentrant cylindrical portion 56.

The glass envelope 51 is shown as continuing through the two resonant cavities 45 and 46. In the construction of the device metal partitions 47 may be built into the tube with glass-to-metal seals and with the partitions left projecting a short distance outside of the envelope. Circular channels 48 may then be slipped over the ends of the tube and brought into contact with the partitions 47 to form the resonant chambers 45, 46.

The operation of the device of Fig. 3 is similar in general to that described above in connection with Fig. 1. The input signal on lead 34 is brought into the input resonator 45 and sets up potential differences between the inner cathode 11 and control grid 52, thus modulating both the velocity and the electron convection current of the inner stream. An outer stream from cathode 12 is added and the two streams are projected lengthwise of the tube with different velocities. One or both streams pass across the gap 55, 56 and set up amplified output waves in the output resonator 46 which are taken off through the coaxial line 41, 44. The path of travel of the two waves is several wavelengths long and the current density and velocity separation between the two streams are sufficient to cause a space-charge wave to develop within the cylindrical tube 50, which grows in amplitude with distance of travel, resulting in amplification of the input waves.

Figure 4:
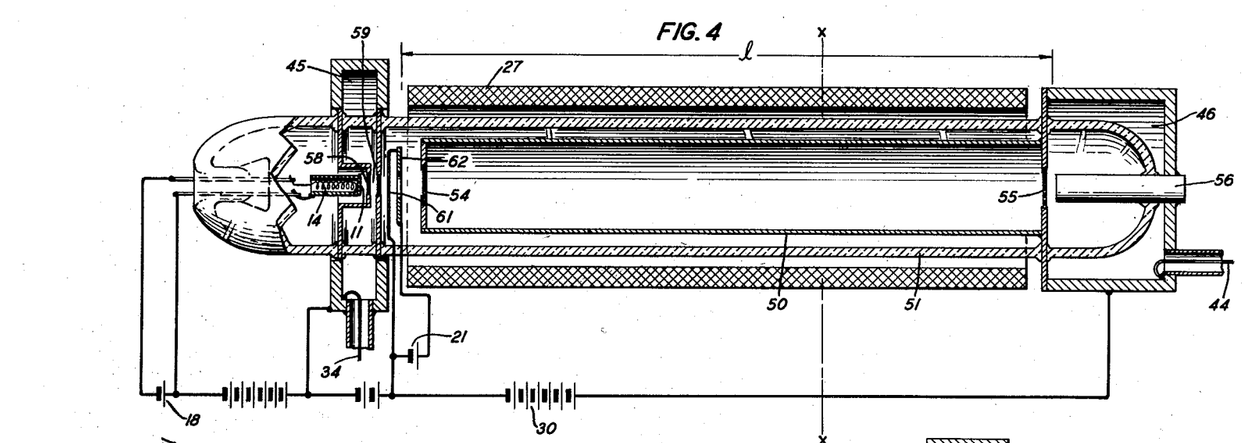
Figs. 4 and 4A are similar views of still different forms of embodiments of the invention.

In Fig. 4 the construction is generally similar to that of Fig. 3 but in this case instead of having an inner stream surrounded by an outer stream both streams are confluent, the electrons of one stream mingling with those forming the other stream.

The higher velocity stream from cathode 11 is velocity modulated by the two grids 58, 59 formed in opposite walls of the input resonant chamber 45. The second stream originates on a filamentary cathode 61, which is mounted on a shield 62 having a central aperture. The filament 61 may be looped across this aperture in the manner shown in Fig. 4B. The shield 62 is maintained at positive potential with respect to cathode 11 and cavity 45. The shield 62, therefore, acts as an accelerator for the electrons from cathode 11. As the stream from cathode 11 passes through the aperture in shield 62 the second or lower velocity stream originating on cathode 61 immersed in the first stream is added to the first stream. Both streams are accelerated by grid 54.

The construction at the output end of the tube is essentially similar to that shown in Fig. 3 and consists of an output resonant cavity 46 with a reentrant portion 56 which provides a narrow gap 55, 56 at which the energy of the amplified signal waves is picked up, as the electrons from both streams pass across this gap.

In the operation of the device as in the previous figures, the current density and the velocity separation are made sufficiently great and the length of travel sufficiently long to produce amplification of the input waves by the development of a space-charge wave of negative attenuation in the direction of travel of the electrons.

Figures 4A, 4B:
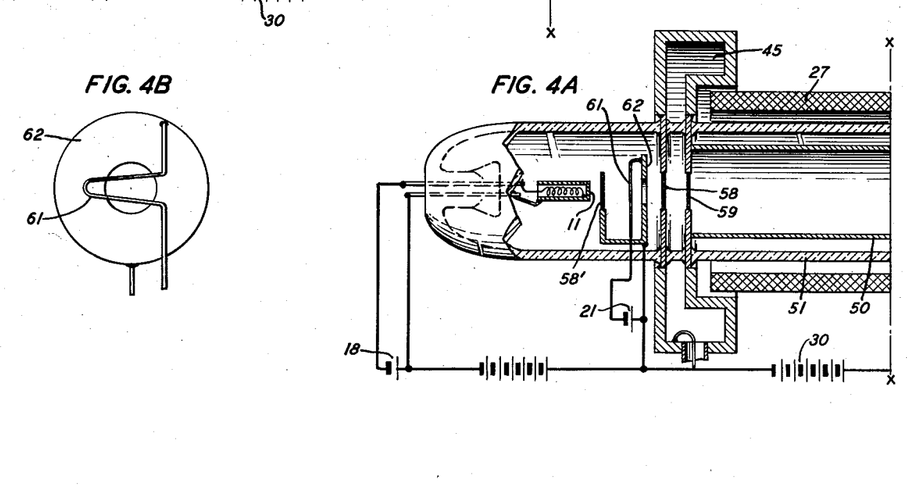
Fig. 4B shows a detail of the shield-cathode structure used in the devices of Figs. 4 and 4A.

Figure 4A illustrates a modification of the Fig. 4 construction in which the resonant cavity 45 is positioned to velocity-modulate both streams. In this case an accelerating grid 58' is interposed between cathode 11 and cathode 61, and it is connected to shield 62 so that it is maintained at a substantially higher positive potential than cathode 11. The resonant cavity is formed in part by grid 58 and by a grid 59 that is mounted in the end of the metal tube 50 like grid 54 in Fig. 4. (The cavity, as shown, is biased to the same potential as anode 56.) In other respects the construction may conform with Fig. 4.

Whereas the structure of Fig. 3 relies more on convection-current modulation than on velocity-modulation, the invention contemplates the use of convection-current modulation alone without any velocity modulation. Thus, in the structure of Fig. 4, if the gap between grids 58 and 59 is made of such length that the electron transit angle across the gap is an integral number of cycles, the beam will be given convection-current modulation without velocity-modulation.

Figure 5:
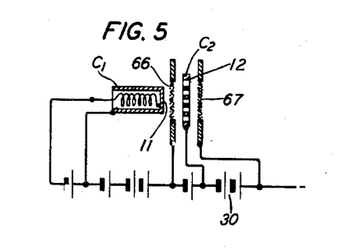
Figs. 5 to 7 show alternative forms of cathode structures according to the invention.
Figure 6:
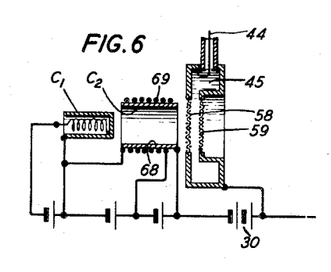
Figure 7:
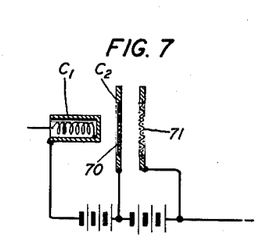

The several complete tube constructions that have been described are illustrative of typical or suitable embodiments of the basic features of the invention. Many variations of tube constructions are possible of which only a few will be mentioned in connection with Figs. 5 to 13, these latter also being only illustrative of different trends which may be followed and not as in anywise limiting. Figs. 5 to 7 are included to illustrate different ways in which the two electron streams can be produced with different velocities, Figs. 8 to 12 illustrate different ways in which the two streams can be separated from each other before abstracting the energy, and Fig. 13 shows an alternative type of output resonator.

In Figs. 5 to 11 the cathode from which the high velocity stream starts is called $C_1$ and the cathode from which the slow velocity stream starts is called $C_2$.

Figure 5A:
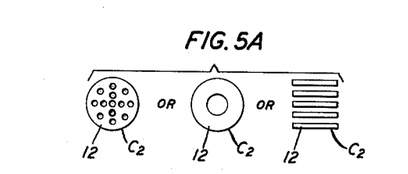

In Figs. 5 and 5A the cathode $C_2$ is heated by electron bombardment by the electrons from the cathode $C_1$. Suitable ways of constructing $C_2$ are shown in Fig. 5A. For example, it may consist of a disc with several apertures through it or with a single large aperture or it may consist of a series of spaced parallel conductors. Electrons from $C_1$ are accelerated by grid 66 and part of them strike the cathode $C_2$ while others pass through the apertures thereof to form the first stream. Cathode $C_2$ is heated by the electron bombardment and emits electrons as a cathode to form the second stream. Both streams are accelerated by grid 67. Both streams are mingled as they are projected down the tube.

In Fig. 6, cathode $C_2$ is formed by coating the inner wall of a hollow cylinder 68 to cause the inner surface to emit electrons when heated by the winding 69 around the outside of the cylinder 68. The winding is supplied with heating current from a section of the battery 30. Cylinder 68 is at higher positive voltage than $C_1$. Electrons from $C_1$ mingle with those emitted from $C_2$ and both streams are accelerated by the positive grids 58, 59 which also serve to modulate the velocity of both streams since they are included in the opposite walls of input resonator 45.

In Fig. 7 the grid 70 serves as an accelerator for electrons emitted from $C_1$ and also serves as the second cathode $C_2$ since it is heated by bombardment of electrons from $C_1$. Grid 71 is an accelerating grid for both streams. In Figs. 5 and 7 the members 12 and 70 may be coated with suitable materials to promote the emission of electrons. In all three of these figures further accelerating grids than those shown may be used. The construction shown in Figs. 5 to 7 may be incorporated in devices otherwise generally similar to those shown in Figs. 1 to 4A, inclusive.

Figure 8:
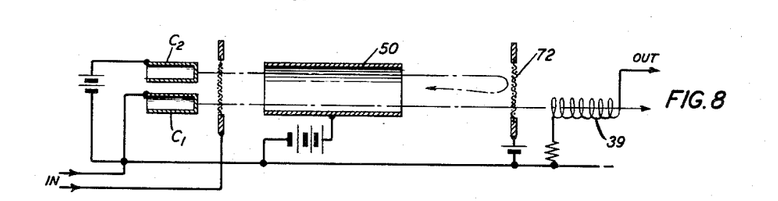

Referring to Fig. 8 a grid 72 near the output end of the tube is provided with a positive bias such as to make this grid more positive than cathode $C_1$ but less positive than cathode $C_2$. When the two streams from the two cathodes are shot down the tube 50 either mingled or in two separate streams, the slower electrons from cathode $C_2$ are repelled by the relatively negative grid 72 and are turned back while the faster electrons from $C_1$ pass through the grid 72. The latter pass into the output energy abstracting means shown in this case as helix 39.

Figures 9, 11:
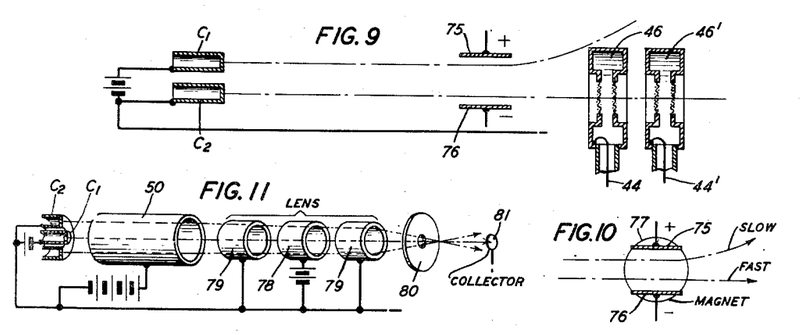

In the construction indicated in Fig. 9 a pair of deflector plates similar to those used in cathode ray tubes are used to deflect the slower moving electrons in the low velocity stream off to one side while allowing the faster electrons to proceed into the output energy collector 46. Suitable direct current voltage is supplied across the plates 75, 76 for this purpose. In the construction shown in Fig. 10 the deflector plates 75, 76 are used but they are supplemented in their action by a magnetic field perpendicular to the plane of the paper, one pole of the magnet for which is shown at 77. The electric and magnetic fields are adjusted to provide equal and opposite deflecting effects for one stream, but the effects will not be equal for a stream of a different velocity and hence one stream is deflected to one side while the other proceeds to the output collector. While both electron streams would be deflected in Fig. 9, it is to be understood that there is a differential deflection sufficient to permit separation of the two streams.

Figure 12:
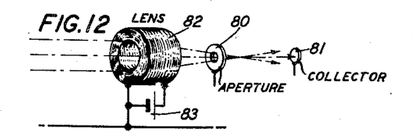
Figure 13:
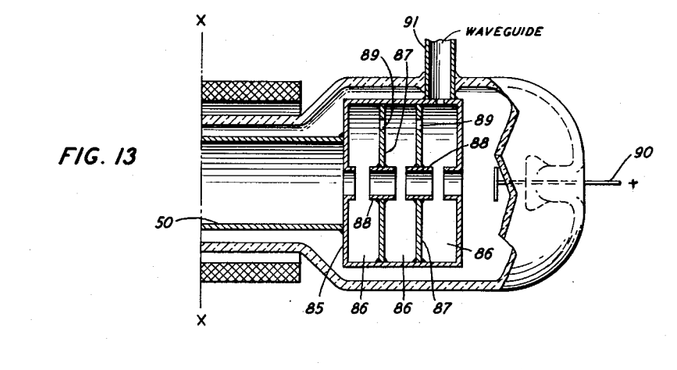
Fig. 13 shows an alternative output coupling that may be substituted for that of Fig. 3 to the right of the line X—X.

In Figs. 11 and 12 the degree of sharpness of focus is relied upon to separate the two streams. The collector 81 indicated as a circle which may in practice be the grid 55 of Figs. 3 and 4 has placed a suitable distance in front of it a shield 80 containing a central aperture. In Fig. 11 electrostatic focussing means or lens elements 78, 79 are shown with just the right voltages applied to them to focus the fast beam of electrons sharply on the aperture 80 allowing the fast beam to pass through this aperture to the output collector 81. These voltages on the lens are not of the right magnitude to bring the slower moving electrons into sharp focus at 80 and these electrons are for the most part scattered and diverted away from the output collector 81. Fig. 12 is similar to Fig. 11 except that in this case a magnetic lens 82 is illustrated comprising a coil of wire supplied with current from battery 83 and wound around a hollow cylinder. The strength of the magnetic field is made such as to focus the fast moving electrons on the aperture at 80 and cause them to strike the collector 81 while diverting the slower moving electrons away from collector 81. Any of these stream separating means that have just been described can be substituted for the separating means shown in Fig. 1 or they may be embodied in other suitable types of tube construction. Theory shows that when the current density is made very high in the increasing space-charge wave the convection currents in the fast and slow streams become almost 180 degrees out-of-phase. Since these convection currents are of unequal magnitudes there is a net electron convection current. However, under these circumstances the convection current in either stream is greater than the net convection current and this is the reason that it may sometimes be desirable to separate the two electron streams before abstracting the power.

The energy may be abstracted at the output end of the device in various ways. A traveling wave type of circuit is shown in Fig. 1 in the form of the helix 39 while resonators have been shown in Figs. 3 and 4. Instead of a single resonator, the stream or streams may be passed through a succession of resonators 46, 46' as shown in Fig. 9. Also various forms of traveling wave constructions may be used, one form being shown in Fig. 13 which figure may be substituted for the portion of Fig. 3 to the right of the broken line X—X.

In the construction shown in Fig. 13 a wave guide is shown comprising a succession of resonant chambers 86 separated by partitions 87 in which suitable irises are provided at 89 for intercoupling adjacent chambers. The structure is designed in accordance with wave guide theory to provide a band transmission characteristic. The partitions 87 have central apertures with tubular walls 88 through which the electron stream or streams may pass to the collector or anode member 90 which is maintained at a suitably positive voltage. The output energy is taken off through a wave guide 91 coupled to the end chamber 86 of the wave guide.

It will now be shown how to calculate the design of a tube of the type shown in Fig. 4 in which the two streams are comingled and together occupy a rod-like space defined as having a diameter $2a$ and a total length length $l$ (Fig. 4).

The streams have direct current densities of $J_{01}$ and $J_{02}$, and direct current velocities corresponding to voltages $V_{01}$ and $V_{02}$. Design calculations are simplified when $$J_{01}/V_{01}^{3/2} = J_{02}/V_{02}^{3/2} \tag{1}$$

It can be shown that for a given voltage separation and given total current this condition is nearly optimum from the standpoint of gain.

The direct current velocities associated with the voltages $V_{01}$ and $V_{02}$ are $u_{01}$ and $u_{02}$, respectively. The fractional velocity separation is $b$. Thus $$b = 2(u_{01} - u_{02})/(u_{01} + u_{02}) = (\sqrt{V_{01}} - \sqrt{V_{02}})/(\sqrt{V_{01}} + \sqrt{V_{02}}) \tag{2}$$

The gain per wavelength depends upon the velocity separation, the direct current space-charge density, the frequency and the beam diameter. For a given beam diameter and a given velocity separation there is a minimum value of space-charge density below which there will be no gain. As the space-charge density increases beyond the minimum critical point, the gain increases rapidly at first and then approaches an upper limiting value asymptotically. The upper limit depends only upon the velocity separation:

Maximum gain = $27.3b$ decibels/wavelength (3)

Having specified the velocity separation, either of the two voltages and either of the two current densities, one can then define an average current density, $J_0$, and an average voltage, $V_0$, such that $$J_0/V_0^{3/2} = J_{01}/V_{01}^{3/2} = J_{02}/V_{02}^{3/2} \tag{4}$$

Thus:

$$V_{01} = V_0/(1-b/2)^2 \approx V_0(1+b) \tag{5}$$
$$V_{02} = V_0/(1+b/2)^2 \approx V_0(1-b) \tag{6}$$
$$J_{01} = J_0/(1-b/2)^3 \approx J_0(1+3b/2) \tag{7}$$
$$J_{02} = J_0/(1+b/2)^3 \approx J_0(1-3b/2) \tag{8}$$

The approximations are correct to the order $b$.

The wavelength, $\lambda_g$, associated with the voltage, $V_0$, is given by $$\lambda_g = 1.98 \times 10^{-3} \lambda_0 \sqrt{V_0} \tag{9}$$

where $\lambda_0$ is the free space wavelength associated with the operating frequency $f$ and the operating angular frequency $\omega = 2\pi f$. ($\lambda_0 = 3 \times 10^4/f$ and where $f$ is the frequency measured in megacycles).

A dimensionless parameter $W_0$ is defined to be $$W_0^2 = \frac{\omega_{e0}^2}{\omega^2} = \frac{8.52 \times 10^6}{f^2} \frac{J_0}{\sqrt{V_0}} \tag{10}$$

where $\omega_{e0}$ is the plasma-electron angular frequency associated with the average space-charge density. The constant in Equation 10 is adjusted so that $J_0$ is expressed in amperes per square centimeter, $V_0$ in volts and $f$, the operating frequency, in megacycles. The current $I_0$ is given by $$I_0 = \pi a^2 J_0 \tag{11}$$

Figure 14:
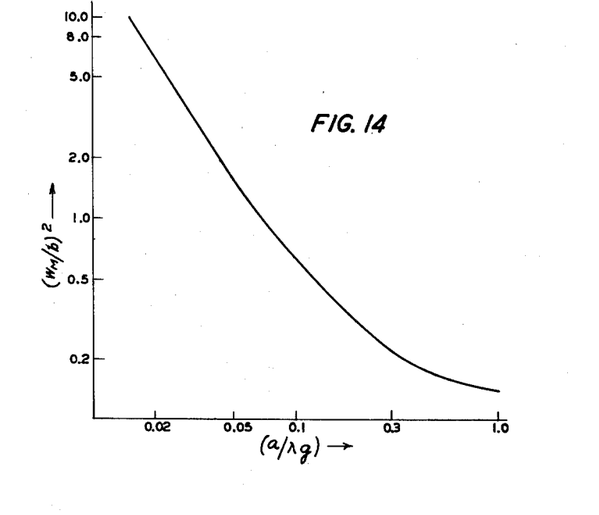
Figs. 14 to 16 show graphs to be referred to in the description of the design procedure.

The minimum value of $W_0$, which will be called $W_M$, below which there is no gain, is a function of the velocity separation and the beam radius normalized by the beam wavelength, $\lambda_g$. A plot of $(W_M/b)^2$ as a function of $(a/\lambda_g)$ is shown in Fig. 14.

Figure 15:
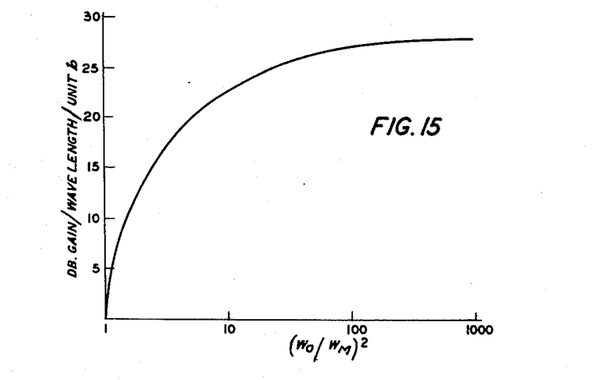

The variation of gain in the interval, $W_M \leq W_0 < \infty$, is shown in Fig. 15 where "Decibels gain/wavelength/unit $b$" is plotted as a function of $(W_0/W_M)^2$.

In a beam of the type considered here, the electrons at the center of the beam are traveling more slowly than the electrons on the surface of the beam. This is due to the decrease in potential at the center of the beam which is due to the space-charge shielding effect of the surrounding electrons. Evidently, if the design calculations are to be of any use, the difference in potential between the center and the outer surface of the beam must be less than the difference of potential between the two streams. Thus, if $\Delta V$ is the potential difference between the center and the outer surface of the beam:

$$(\Delta V/V_0) = 2\alpha b \tag{12}$$

where $\alpha$ must be less than unity. How much less, remains to be determined experimentally.

The restriction of Equation 12 sets an upper limit on the value of the parameter $(I_0/b^2 V_0^{3/2})$ which may be used. This restriction can be stated analytically in terms of the variables already defined:

$$(I_0/b^2 V_0^{3/2}) = .066(\alpha/b) \tag{12a}$$

where $I_0$ is expressed in milliamperes and $V_0$ is expressed in volts.

The use of the curves will now be illustrated by assigning some actual values and working out a design for an amplifier to operate at 200 megacycles and in which the increasing wave has a gain of 40 decibels with a considerable bandwidth. The over-all gain of the tube, from input line 34 to output line 44 of Fig. 1, for instance, is the gain in decibels of the increasing wave as calculated here plus a number of decibels representing gain or loss in establishing the increasing wave by means of the signal applied to line 34 and in coupling the increasing wave by means of the output helix 39 to the output line 44.

The first step is to select an average voltage and a value for the velocity separation. It is advantageous to take a low value for the voltage since the lower the voltage the higher will be the gain per wavelength. Also the tube becomes longer in terms of wavelength. A high value of $b$ means high gain per wavelength. The values selected, after preliminary trial calculations if necessary, are $$V_0 = 50 \text{ volts}$$
$$b = 0.2$$

The next step is to decide on a value of $\alpha$. It must be less than unity and the accuracy of the design curves is greater as its value is less. Again, after preliminary trial calculations, a value is selected of $$\alpha = 0.394$$

Then from Equation 12a, $$I_0/b^2 V_0^{3/2} = 0.13$$
$$I_0 = 1.84 \text{ ma.}$$

and from Equations 5 to 8

$$I_{01} = 2.39 \text{ ma.}$$
$$I_{02} = 1.29 \text{ ma.}$$
$$V_{01} = 60 \text{ volts}$$
$$V_{02} = 40 \text{ volts}$$
$$V_0 = 50 \text{ volts}$$

It is also necessary to choose a value of the beam radius $a$. In this case $a$ will be chosen so that $a/\lambda_g = .5$ at $f = 200$ megacycles. This requires a beam radius $a = 0.417$ inch. A beam length of 11.25 inches was chosen.

The next step is to compute $W_0^2$ from (10) for a number of frequencies. For these same frequencies one computes $\lambda_g$ from (9) and then obtains $(W_m/b)^2$ from Fig. 14. As $b$ has been chosen, one can thus obtain $W_m^2$ for these frequencies, and hence $(W_m/W_0)^2$. Having $(W_m/W_0)^2$, one obtains the gain in decibels gain/wavelength/unit $b$ at these frequencies from Fig. 15. Then the total gain of the increasing wave is obtained at each frequency as Gain = (decibels gain/wavelength/unit $b$)

$(b)(l/\lambda_g)$ decibels

Using the data and procedure assumed above, the gain has been computed at several frequencies and is shown in the table below.

| Frequency in Megacycles | $a/\lambda_g$ | db gain per Wavelength per Unit $b$ | db gain per Wavelength | No. of Wavelengths | db Total Gain |
|---|---|---|---|---|---|
| 100 | 0.25 | 21.1 | 4.22 | 6.75 | 28.5 |
| 150 | .375 | 18.0 | 3.60 | 10.1 | 36.4 |
| 175 | .438 | 16.4 | 3.28 | 11.8 | 38.7 |
| 200 | .5 | 14.8 | 2.96 | 13.5 | 40. |
| 225 | .563 | 13.0 | 2.60 | 15.2 | 39.5 |
| 250 | .625 | 11.2 | 2.24 | 16.9 | 37.8 |
| 300 | .75 | 7.5 | 1.50 | 20.2 | 30.3 |

Figure 16:
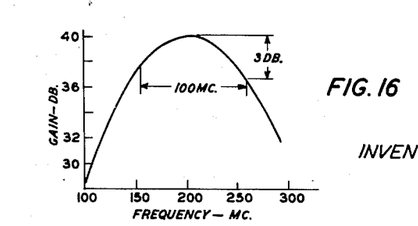

A curve of gain vs. frequency for this set of values is plotted in Fig. 16. This curve shows a bandwidth of about 100 megacycles centered at approximately 200 megacycles, the band being taken as that included between the 3-decibel loss points which occur at about 158 megacycles and 258 megacycles, respectively.

As a rough indication of the dependence of tube characteristic upon the value chosen for $a/\lambda_g$, it is noted that if a value for this quantity as low as 0.2 had been chosen, and if the calculations had been carried through in the same manner except on the basis of this value of 0.2, the bandwidth would have turned out to be about 175 megacycles centered at about 520 megacycles with midfrequency gain of 67 decibels, and the beam length would be 7.5 inches.

From the above table and from Fig. 16 it may be seen that the gain has a maximum at about 200 megacycles. This is not fortuitous, for by previous trials $a/\lambda_g$, $b$ and $\alpha$ were so chosen as to bring about this result. If the maximum gain occurs at other than the desired frequency, two courses are open. One can try other values of $a/\lambda_g$, $b$ or $\alpha$ until maximum gain occurs at the desired frequency or one can apply a scaling law. This law says that if $I_0$, $V_0$ and $b$ are held constant and if all dimensions are multiplied by a factor K, the frequency for maximum gain will be multiplied by a factor $1/K$, or, the wavelength for optimum gain will be multiplied by a factor K. This is thus an easy method for adjusting the frequency at which maximum gain occurs.

The design represented by the curve of Fig. 16 was based upon an assumed valued of $\alpha = 0.394$. Had a lower value been chosen, of $\alpha = 0.1$, and the other assumed values remained the same, a characteristic nearly the same as that of Fig. 18 would have been obtained (bandwidth 110 megacycles centered at about 210 megacycles, total gain 40 decibels at mid-band) but values for the currents would then be:

$$I_0 = 0.455 \text{ ma.}$$
$$I_{01} = .59$$
$$I_{02} = .32$$

The beam diameter would in that case be 0.330 inch and the beam length would be 12.62 inches.

The foregoing illustrative data applies to the design of the beam, and does not take account of the frequency characteristics of the input and output couplings, since these can be separately computed in known manner for the particular types used in any actual construction.

The foregoing examples are based upon the assumptions of completely intermixed streams and a longitudinal magnetic focussing field of infinite strength, and these can only be approached, of course, in an actual case. If the streams are not completely intermixed a higher value of $I_0$, $I_{01}$ and $I_{02}$ must be used, to provide greater space-charge density, in order to obtain the same gain. Higher space-charge density must also be used if the effect of less than infinitely great focussing field is to be compensated.

The accuracy of the design formulae given above is increased as $b$ and $\alpha$ are decreased.

The basic character of the invention permits of wide latitude in types and constructions, differing widely from those described in detail or indicated in the foregoing specification, within the scope of the invention, as defined in the claims.

What is claimed is:

1. In a space discharge device, an elongated cylindrical metal tube, two cathodes near one end of the tube, means to bias said tube highly positive relative to both cathodes but at greater potential toward one than toward the other cathode, an electron collector near the other end of the tube, focussing means for causing electrons emitted from the two cathodes to travel in commingled relation longitudinally through said tube to said collector in beam form, means including said cathodes for supplying sufficient electron current to bring the current density inside said tube above the minimum required to produce space-charge waves increasing in amplitude with distance of travel.

2. A device according to claim 1 including a velocity-modulating means for the electrons emitted from at least one of said cathodes, and energy-abstracting means near the far end of said tube.

3. A device according to claim 1 including a pair of grids spaced apart along the path of travel of said electrons for velocity-modulating the electron stream from at least one of said cathodes.

4. A device according to claim 1 including a short terminated helix coupled to the electron stream from a cathode for velocity-modulating said stream.

5. A device according to claim 1 including means near one end of the tube to velocity-modulate the electron stream from at least one cathode and a resonator near the other end of the tube for taking off wave energy from the electron beam or beams.

6. A device according to claim 1 including means to velocity-modulate the electron stream from one cathode and a short section of wave guide near the far end of said tube for taking off wave energy from the electron beam or beams.

7. A device according to claim 1 in which the electron stream from one cathode passes through an aperture in the other cathode.

8. A device according to claim 1 in which one cathode is heated to make it an efficient electron emitter by electron bombardment from the other cathode.

9. A device according to claim 1 including means following said cathodes for velocity-modulating the electron streams from both cathodes.

10. A device according to claim 1 including means for impressing convection-current modulation on at least one of said streams.

11. An electric wave amplifier comprising an evacuated enclosure, means including an accelerating electrode and a pair of adjacent electron sources substantially aligned therewith to project two streams of electrons within said enclosure at mutually different velocities in substantially commingled relation with each other along a predetermined path whereby said streams will support space-charge waves increasing in amplitude along said path as a result of energy exchanges between the two streams, and electrode means common to the two streams for collecting both.

12. An electric wave amplifier comprising an evacuated enclosure, means to produce along a predetermined path within said evacuated enclosure a pair of confluent electromechanically-coupled electron streams of mutually different velocities whereby said streams react on each other to support space-charge waves propagated along said streams with negative attenuation, wave input means at one place along said path to modulate at least one of said streams with a wave to be amplified, and wave output means at another place along said path removed at least several wavelengths from said one place for abstracting the amplified wave from at least one of said streams.

13. An amplifier in accordance with claim 12 in which said wave output means is coupled to both of said streams at said respective place.

14. An amplifier in accordance with claim 12 in which said wave output means is coupled to the faster of said streams at said respective place.

15. An amplifier in accordance with claim 12 in which said wave input means comprises means to velocity-modulate at least one of said streams at said respective place.

16. An electric wave amplifier comprising means for projecting a pair of confluent electron streams of mutually different velocities along a predetermined path with current densities above the minimum required to support a space-charge wave of increasing amplitude with increasing distance of travel along said confluent streams, wave input means coupled to at least one of said streams near the source thereof for velocity-modulating at least said one stream to produce space-charge waves therein, conductive means around a portion of said path at least several wavelengths long for inhibiting corresponding electromagnetic waves in said path portion, and wave output means coupled to at least one of said streams beyond said path portion.

17. An electric wave amplifier comprising means for projecting a pair of confluent electron streams of mutually different velocities along a predetermined path, wave input means coupled to at least one of said streams near the source thereof for velocity-modulating at least said one stream to produce space-charge waves therein, conductive means around a portion of said path at least several wavelengths long for inhibiting corresponding electromagnetic waves in said path portion, and wave output means comprising a cavity resonator coupled to both said streams beyond said path portion.

18. In combination, means to produce a pair of like-directed confluent electron streams of mutually different velocities coupled to each other over a predetermined path portion predominantly by electromechanical coupling, a pair of electromagnetic couplers each coupled to at least one of said streams at respective points on opposite sides of said path portion, and electrode means to collect both said streams after they have reached the second of said points.

19. A wave amplifier comprising an evacuated enclosure, means for projecting a stream of electrons through said evacuated enclosure, means for projecting another stream of electrons with a different velocity than said first stream through said evacuated enclosure in substantially completely commingled relation with said first stream so as to utilize the back-and-forth exchanges of energy between the fields of said two streams as the streams progress through space to augment each other until they build up to the desired amplitude, and means for abstracting wave energy from at least one of said streams.

20. An electric wave amplifier comprising means defining a wave transmission path characterized by substantially lesser storage of magnetic energy than of electric energy of a transmitted wave, means to project a wave-modulated stream of charged particles along said path in continuously-coupled relation thereto over a distance that is at least several wavelengths for negatively attenuated space-charge waves supported by said coupled path and stream, and wave output means adjacent the downstream end of said coupled path and stream for abstracting amplified wave energy therefrom.

21. In an electric wave amplifier, an evacuated enclosure, means to produce in said enclosure a pair of like-directed intermingled electron streams of discretely different velocities coupled to each other continuously over a predetermined path portion predominantly by electromechanical coupling and with current density above a minimum required to support a negatively attenuated space-charge wave in said path portion, wave input means upstream from said path portion for modulating at least one of said streams, and means downstream from said path portion for extracting wave energy from both of said streams, the length of said path portion being at least several wavelengths.

22. The subject-matter of claim 21 in which said last-mentioned means comprises an electromagnetic coupler coupled to both of said streams.

23. High frequency electronic apparatus comprising an evacuated envelope, means including a pair of electron sources and an electron accelerator within said envelope to project electrons from the respective sources at mutually different velocities as intermingled components of a stream of electrons all traveling in the same direction with current density greater than the minimum required for the stream to support negatively attenuated space-charge waves, and wave output means coupled to both said stream components to abstract wave energy therefrom.

24. High frequency electronic apparatus comprising an evacuated envelope, a pair of electron sources and accelerating electrode means within said envelope, means including said accelerating electrode means to project from said sources a corresponding pair of electron streams of mutually different velocities flowing in the same direction in close electro-mechanically coupled relation to each other with current density greater than a minimum required for the coupled streams to support space-charge waves traveling in the direction of movement of the streams with an amplitude increasing with distance of travel, and a wave output coupler positioned to be traversed by both said streams.

25. High frequency electronic apparatus comprising an evacuated envelope, a pair of electron sources and accelerating electrode means within said envelope, means including said accelerating electrode means to project from said sources a corresponding pair of electron streams of mutually different velocities flowing in the same direction in close electromechanically coupled relation to each other with current density greater than a minimum required for the coupled streams to support space-charge waves traveling in the direction of movement of the streams with an amplitude increasing with distance of travel, wave input means near said sources to modulate at least one of said streams, collector means many space-charge wavelengths downstream from said wave input means to collect both said streams, and wave output means coupled to at least one of said streams many space-charge wavelengths downstream from said wave input means.

26. In an electric wave amplifying system, an evacuated enclosure, a pair of electron sources in said enclosure, means including an electron accelerator in said enclosure to project from said sources along a predetermined path a corresponding pair of like-directed intermingled electron streams of mutually different velocities that are continuously coupled to each other predominantly by electromechanical coupling over at least a portion of said path and that have current densities above a minimum required to support negatively-attenuated space-charge waves in said path portion, signal input means upstream from said path portion to modulate at least one of said streams with signal waves to be amplified, collector electrode means downstream of said path portion for collecting both of said streams, signal output means downstream of said path portion and coupled to at least one of said streams for extracting an amplified replica of the said signal waves, the length of said path portion being at least several times the space-charge wavelength of said signal waves.

27. The subject matter of claim 26 in which said signal output means is selectively responsive to a frequency band embracing the said signal to be amplified.

28. An electron discharge device comprising an envelope containing a collector electrode, an electron gun structure spaced from said collector electrode, and an elongated drift tube extending between said gun structure and said collector electrode; said gun comprising two spaced closely adjacent cathodes and grid means adjacent to said cathodes and uniformly spaced therefrom, the emitting surfaces of said two cathodes being so oriented relative to each other, said drift tube and said collector electrode that the two electron streams from said cathodes extend in the same general direction through said drift tube, and in space charge coupling relation with each other throughout the major portion of the length of said tube to said collector electrode, said cathodes having separate leads extending through said envelope to permit the application of different potentials to said cathodes for imparting different velocities to said streams.

29. An electron discharge device comprising an envelope containing a collector electrode, an electron gun structure spaced from said collector electrode, and an elongated drift tube extending between said gun structure and said collector electrode; said gun structure comprising two spaced closely adjacent cathodes, the emitting surfaces of said two cathodes being so oriented relative to each other, said drift tube and said collector electrode that the two electron streams from said cathodes extend in the same general direction through said drift tube, and in space charge coupling relation with each other throughout the major portion of the length of said tube to said collector electrode, said cathodes having separate leads extending through said envelope to permit the application of different potentials to said electrodes for imparting different velocities to said streams.

References Cited in the file of this patent

UNITED STATES PATENTS

| | | |
|---|---|---|
| 2,245,627 | Varian | June 17, 1941 |
| 2,300,052 | Lindenblad | Oct. 27, 1942 |
| 2,320,860 | Fremlin | June 1, 1943 |
| 2,381,320 | Tawney | Aug. 7, 1945 |
| 2,406,370 | Hansen et al. | Aug. 27, 1946 |
| 2,407,667 | Kircher | Sept. 17, 1946 |
| 2,416,283 | Bowen | Feb. 25, 1947 |
| 2,578,434 | Lindenblad | Dec. 11, 1951 |

OTHER REFERENCES

Article by Rudolf Kompfner, pp. 124–127, Proc. I. R. E. for February 1947. Copy in Pat. Off. Scien. Libr.